United States Patent
Burchfield et al.

(10) Patent No.: US 9,059,960 B2
(45) Date of Patent: Jun. 16, 2015

(54) AUTOMATICALLY RECOMMENDING FIREWALL RULES DURING ENTERPRISE INFORMATION TECHNOLOGY TRANSFORMATION

(75) Inventors: Nancy Burchfield, Dana Point, CA (US); Nathaniel Hang, Ladera Ranch, CA (US); Rafah A. Hosn, New York, NY (US); James Murray, Durham, NC (US); Harigovind V. Ramasamy, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 13/600,891

(22) Filed: Aug. 31, 2012

(65) Prior Publication Data
US 2014/0068698 A1 Mar. 6, 2014

(51) Int. Cl.
H04L 29/06 (2006.01)

(52) U.S. Cl.
CPC ............ H04L 63/02 (2013.01); H04L 63/0263 (2013.01)

(58) Field of Classification Search
CPC ............................ H04L 63/02; H04L 63/0263
USPC ...................................................... 726/1, 11
See application file for complete search history.

(56) References Cited

U.S. PATENT DOCUMENTS

| | | | |
|---|---|---|---|
| 6,820,266 B1 * | 11/2004 | Minakawa et al. ............ 719/313 |
| 7,213,027 B1 * | 5/2007 | Kominek et al. ...................... 1/1 |
| 7,392,539 B2 * | 6/2008 | Brooks et al. .................... 726/11 |
| 7,472,412 B2 * | 12/2008 | Wolf et al. ......................... 726/6 |
| 7,539,741 B2 * | 5/2009 | Liong et al. .................... 709/223 |
| 7,747,416 B2 * | 6/2010 | Deininger et al. ............. 702/188 |
| 7,809,817 B2 * | 10/2010 | Hillier ............................ 709/223 |
| 7,853,687 B2 * | 12/2010 | Le Moigne et al. ........... 709/224 |
| 7,966,659 B1 * | 6/2011 | Wilkinson et al. .............. 726/22 |
| 8,060,553 B2 * | 11/2011 | Mamou et al. ................. 709/203 |
| 8,272,031 B2 * | 9/2012 | Abderrazzaq et al. ............ 726/1 |
| 8,291,468 B1 * | 10/2012 | Chickering ....................... 726/1 |
| 8,516,241 B2 * | 8/2013 | Chang et al. .................. 713/151 |
| 8,607,300 B2 * | 12/2013 | Wang ................................. 726/1 |
| 8,671,222 B2 * | 3/2014 | Gass et al. ..................... 709/246 |
| 8,706,771 B2 * | 4/2014 | Gass et al. ..................... 707/803 |
| 2002/0133579 A1 * | 9/2002 | Bernhardt et al. ............. 709/223 |
| 2003/0037327 A1 * | 2/2003 | Cicciarelli et al. ............. 717/178 |
| 2003/0133552 A1 * | 7/2003 | Pillai et al. .................. 379/114.2 |
| 2003/0154071 A1 * | 8/2003 | Shreve ............................... 704/9 |

(Continued)

OTHER PUBLICATIONS

Abassi et al., A Model for Specification and Validation of Security Policies in Communication Networks: The Firewall Case, 2008.

(Continued)

*Primary Examiner* — David Garcia Cervetti
(74) *Attorney, Agent, or Firm* — Ryan, Mason & Lewis, LLP

(57) ABSTRACT

Techniques for automatically generating one or more rules during IT transformation for configuring one or more firewall interfaces in a post-transformation target environment. A method includes obtaining at least one communication pattern occurring in a pre-transformation source environment, and automatically generating one or more vendor-neutral rules for one or more intended firewall interfaces in a post-transformation target environment based on the at least one communication pattern occurring in the source environment and based on information derived from the target environment.

19 Claims, 4 Drawing Sheets

(56) References Cited

U.S. PATENT DOCUMENTS

| | | | | |
|---|---|---|---|---|
| 2003/0236690 | A1* | 12/2003 | Johnston-Watt et al. | 705/7 |
| 2004/0039942 | A1* | 2/2004 | Cooper et al. | 713/201 |
| 2004/0199609 | A1* | 10/2004 | Papatla et al. | 709/220 |
| 2005/0015471 | A1* | 1/2005 | Zhang et al. | 709/221 |
| 2005/0091068 | A1* | 4/2005 | Ramamoorthy et al. | 705/1 |
| 2005/0149721 | A1* | 7/2005 | Lu | 713/154 |
| 2005/0160361 | A1* | 7/2005 | Young | 715/513 |
| 2005/0216897 | A1* | 9/2005 | Amrhein et al. | 717/136 |
| 2006/0047720 | A1* | 3/2006 | Kulkarni et al. | 707/204 |
| 2006/0242690 | A1* | 10/2006 | Wolf et al. | 726/6 |
| 2006/0288409 | A1* | 12/2006 | Bartal et al. | 726/11 |
| 2007/0006122 | A1* | 1/2007 | Bailey et al. | 717/101 |
| 2007/0136813 | A1* | 6/2007 | Wong | 726/25 |
| 2007/0250615 | A1* | 10/2007 | Hillier | 709/223 |
| 2007/0250621 | A1* | 10/2007 | Hillier | 709/224 |
| 2007/0282982 | A1* | 12/2007 | Childress et al. | 709/223 |
| 2008/0222290 | A1* | 9/2008 | Le Moigne et al. | 709/226 |
| 2009/0158302 | A1* | 6/2009 | Nicodemus et al. | 719/328 |
| 2009/0158407 | A1* | 6/2009 | Nicodemus et al. | 726/6 |
| 2010/0064341 | A1* | 3/2010 | Aldera | 726/1 |
| 2010/0095348 | A1* | 4/2010 | Foster et al. | 726/1 |
| 2010/0238945 | A1* | 9/2010 | McKernan et al. | 370/401 |
| 2010/0332401 | A1* | 12/2010 | Prahlad et al. | 705/80 |
| 2010/0332454 | A1* | 12/2010 | Prahlad et al. | 707/654 |
| 2010/0332456 | A1* | 12/2010 | Prahlad et al. | 707/664 |
| 2010/0332479 | A1* | 12/2010 | Prahlad et al. | 707/741 |
| 2010/0332818 | A1* | 12/2010 | Prahlad et al. | 713/150 |
| 2010/0333116 | A1* | 12/2010 | Prahlad et al. | 719/328 |
| 2011/0051715 | A1* | 3/2011 | Grunwald et al. | 370/352 |
| 2011/0072504 | A1* | 3/2011 | Abderrazzaq et al. | 726/11 |
| 2011/0078211 | A1* | 3/2011 | Gass et al. | 707/803 |
| 2011/0282995 | A1* | 11/2011 | Gass et al. | 709/226 |
| 2011/0283269 | A1* | 11/2011 | Gass et al. | 717/168 |
| 2011/0283270 | A1* | 11/2011 | Gass et al. | 717/168 |
| 2011/0296391 | A1* | 12/2011 | Gass et al. | 717/168 |
| 2011/0302647 | A1* | 12/2011 | Bhattacharya et al. | 726/11 |
| 2012/0033681 | A1* | 2/2012 | Ridel et al. | 370/466 |
| 2013/0019277 | A1* | 1/2013 | Chang et al. | 726/1 |
| 2013/0191531 | A1* | 7/2013 | Kruglick | 709/224 |
| 2013/0276066 | A1* | 10/2013 | Buehl | 726/4 |
| 2013/0339882 | A1* | 12/2013 | Owen et al. | 715/762 |

OTHER PUBLICATIONS

Abassi et al., Towards an Automated Firewall Security Policies Validation Process, 2008.
Adel et al., Policy Segmentation for Intelligent Firewall Testing, 2005.
Al-Haj et al., Measuring Firewall Security, 2011.
Al-Shaer et al., Conflict Classification and Analysis of Distributed Firewall Policies, 2005.
Al-Shaer et al., Firewall Policy Advisor for Anomaly Discovery and Rule Editing, 2003.
Al-Shaer et al., Management and Translation of Filtering Security Policies, 2003.
Al-Shaer et al., Discovery of Policy Anomalies in Distributed Firewalls, 2004.
Al-Shaer et al., Modeling and Management of Firewall Policies, 2004.
Youssef et al., Systematic Deployment of Network Security Policy in Centralized and Distributed Firewalls, 2011.
El-Atawy et al., An Automated Framework for Validating Firewall Policy Enforcement, 2007.
Golnabi et al., Analysis of Firewall Policy Rules Using Data Mining Technique, 2006.
Hamed et al. Taxonomy of Conflicts in Network Security Policies, 2006.
Hassan, Algorithms for Verifying Firewall and Router Access Lists, 2003.
Hassan et al., A Framework for Translating a High Level Security Policy Into Low Level Security Mechanisms, 2009.
Kotenko et al., Verification of Security Policy Filtering Rules by Model Checking, 2011.
Liu et al., Firewall Policy Queries, 2009.
Mayer et al., Fang: a Firewall Analysis Engine, 2000.
Rahman et al., A Declarative Approach for Global Network Security Configuration Verification and Evaluation, 2011.
Salah et al., A Probing Technique for Discovering Last-Matching Rules of a Network Firewall, 2008.
Yi et al., Inconsistency Detection System for Security Policy and Firewall Policy, 2010.
Yiwen et al., Verify Consistency Between Security Policy and Firewall Policy with Answer Set Programming, 2008.

* cited by examiner

AUTOMATICALLY RECOMMENDING FIREWALL RULES DURING ENTERPRISE INFORMATION TECHNOLOGY TRANSFORMATION

FIELD OF THE INVENTION

Embodiments of the invention generally relate to computer systems, and computer system service technologies, information technology (IT), and, more particularly, to IT transformation tasks.

BACKGROUND

Migration, consolidation, virtualization, data center relocation, and cloudification are examples of large-scale coordinated changes to an organization's IT infrastructure. These changes may pertain to servers, services, or applications. As used herein, those as well as similar tasks are collectively referred to as "IT transformation." Also, the original IT infrastructure is referred to as the source infrastructure or source environment, and the new IT infrastructure (which in some cases may include part of the source environment) is referred to as the target infrastructure or target environment. The source and target IT infrastructures may be physical or virtual, may include the same or different server/device platforms, and may be located in a traditional data center, server rack, or even the cloud. During many such activities, a common requirement is that components that were able to communicate in the source environment should also be able to do so in the target environment. For example, it may be required that a set of clients that were previously able to communicate with a server in the source environment should also be able to do the same with the migrated server in the target environment.

Accordingly, in IT transformation activities, the network device infrastructure (which includes routers, firewalls, switches, etc.) may need to be configured such that communication patterns (plus or minus some patterns) in the source environment are represented in the target environment. In existing approaches, firewall configuration in the target environment is performed by migration architects in a complex, manual, and error-prone fashion, often resulting in missed deadlines, incorrect networking setups, and application failures. The following factors can contribute to the complexity and error-prone nature of this exercise:

- Some transformation activities may also involve optimization of security and communications. In such scenarios, some communications that were allowed in the source environment may be identified as security holes that need to be plugged or are no longer necessary in the target environment. Likewise, new applications may be introduced in the target environment, and as a result, new communications that were not prevalent in the source environment may need to be introduced in the target environment.
- Often in IT transformation, the network topology in the target environment may differ (partially or completely) from that in the source environment.
- The network devices in the target environment may be from a different vendor or different versions/models from the same vendor.
- The transformation activities may be applied to a subset of the devices, servers, services, and/or applications in the source environment or to the entire environment.

A need therefore exists to provide migration architects with an automated and intelligent capability for analyzing, designing, and configuring firewalls as part of IT transformation activities.

SUMMARY

In one aspect of the present invention, techniques for configuring firewall rules during IT transformation are provided. An exemplary computer-implemented method for automatically generating one or more rules during IT transformation for configuring one or more firewall interfaces in a post-transformation target environment can include steps of obtaining at least one communication pattern occurring in a pre-transformation source environment, and automatically generating one or more vendor-neutral rules for one or more intended firewall interfaces in a post-transformation target environment based on the at least one communication pattern occurring in the source environment and based on information derived from the target environment.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
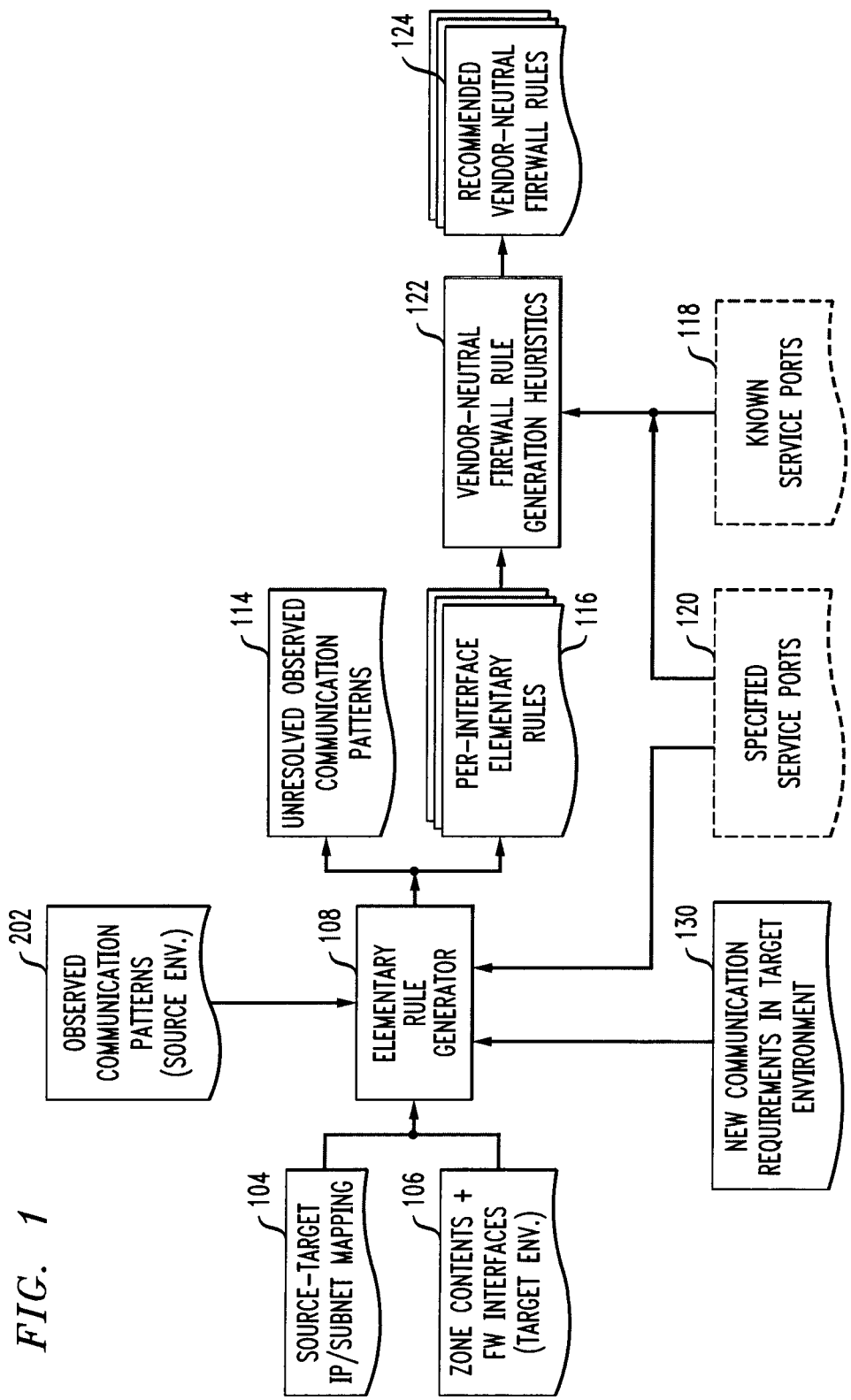
FIG. 1 and FIG. 2 are diagrams illustrating rule generation, according to at least one embodiment of the invention.

As described herein, an aspect of the present invention includes automatically recommending firewall rules during an enterprise IT transformation. As noted herein, enterprise IT transformation activities can include migration and consolidation of applications from one IT infrastructure (for example, a source) to another (for example, a target). The target infrastructure can include, for example, a new data center or the cloud. As detailed herein, at least one embodiment of the invention includes automatic generation of rules for configuring the firewalls in a target environment, on a per-interface basis, using (potentially incomplete or partial) discovery data about a source environment and/or details about communication required in the target environment and/or details about security controls required in the target environment.

By way of example, the firewall infrastructure in a source environment may include numerous firewalls, and obtaining access to each firewall may not be possible. Further, even if all of the firewalls could be accessed, such access may not prove entirely useful because, as part of the migration, security and communication optimizations may be required. In such scenarios, as noted, some communications that were allowed in the source environment may be identified as security holes that need to be plugged or are no longer necessary in the target environment. Likewise, new applications may be introduced in the target environment, and as a result, new communications may need to be introduced in the target environment. Moreover, the network topology in the source environment and the target environment may be different. Furthermore, the firewall devices in the source and target environments may be from a different set of vendors, different models, and/or different versions.

Accordingly, at least one embodiment of the invention includes automatically recommending rules for firewalls in the target environment, on a per-interface basis, during an IT transformation. In such techniques, knowledge about communication patterns happening in the source environment are used to generate abstract vendor-neutral rules from these patterns for each intended firewall interface in a target environment. Additionally, abstract vendor-neutral rules can be converted into actual commands for specific firewalls belonging to a particular vendor.

Vendor-neutral rules are not specific to any particular firewall vendor, and contain the values for one or more attributes generally needed for configuring flow control in the network. Examples of these attributes can include source internet protocol (IP) address, source subnet, destination IP address, destination subnet, protocol (for example, transmission control protocol (TCP), user datagram protocol (UDP)), action to be taken (that is, accept packet or deny packet), port number(s), and traffic direction (incoming or outgoing or both). Vendor-specific rules are commands that be directly used to configure a particular firewall device.

Knowledge about communication patterns in the source environment may be obtained by performing analysis of firewall configuration files associated with the source environment, observing run-time network flow at the source environment, analyzing configured dependencies at one or more servers running on the source environment, analyzing firewall log files, or combinations thereof. The communication patterns are typically expressed using attributes such as source IP address, source subnet, destination IP address, destination subnet, protocol (for example, TCP, UDP), action to be taken (that is, accept packet or deny packet), port number(s), traffic direction (incoming or outgoing or both), or combinations thereof. For example, a run-time network flow at the source environment may be obtained by running the netstat tool available on many common platforms. As a specific example, the netstat tool run on a host with IP address 192.168.254.200 may reveal the following communication pattern, where there is a connection between 192.168.254.200 at port 22 (ssh) and 64.73.135.198 at port 19583; that is, 192.168.254.200 is likely a ssh server.

FIG. 1 is a diagram illustrating firewall migration analytics, according to an embodiment of the present invention. By way of illustration, FIG. 1 depicts observed communications patterns 202 (in the source environment), a source-target mapping component 104 and zone contents and firewall interfaces (for the target environment) 106, all of which is provided to an elementary rule generator component 108. Optionally, specified services ports 120 and known services ports 118 may also be provided as input to the elementary rule generator component. Source-target mapping provides information on how an IP address that occurs in the communication pattern(s) changes as a result of the IT transformation activity. For example, the source-target mapping may specify that the IP address of the ssh server changes from 192.168.254.200 to 10.20.6.11 as a result of the IT transformation. Zone contents and firewall interfaces (for the target environment) information provides the security zone structure of the target environment, that is, which subnets belong to which security zone, where there are at least two firewall interfaces separating every pair of zones, etc.

Elementary information about service ports is useful in the generation of firewall rules. In the above example of host 64.73.135.198 having a connection with host 192.168.254.200 at the (ssh) service port, the elementary rule generator will deduce that firewalls on the path between those hosts were configured to allow clients such as 64.73.135.198 to connect to the server 192.168.254.200 at port 22 in the source environment. Ports such as 21, 22, and 80 fall into the known service ports category, because they have been officially registered with the Internet Assigned Numbers Authority (IANA) and assigned for specific services (ftp, ssh, and http, respectively). Such a list of ports is provided as an (optional) input (represented by known services ports 118 in FIG. 1) to the elementary rule generator 108. Additionally, certain ports may be designated for specific services in the IT infrastructure being considered. A system or network administrator in the source environment may be able to provide this information, which is provided as an (optional) input (represented by specified services ports 120 in FIG. 1) to the elementary rule generator 108. Further, the elementary rule generator receives input in the form of new communication requirements in the target environment 130.

The elementary rule generator 108 generates per-interface elementary rules 116 based on the inputs. An elementary rule is specific to one particular firewall interface in the target environment. The rule identifies attributes such as source IP address, source subnet, destination IP address, destination subnet, protocol (for example, TCP, UDP), action to be taken (that is, accept packet or deny packet), port number(s), traffic direction (incoming or outgoing), rule type, and any connection specific information (for example, TCP SYN and ACK flag values). Any packet arriving at the interface satisfying the attribute values specified in the rule will be subjected to the specified action to be taken; that is, if the action is accept, then the packet will be allowed through the interface; otherwise, the packet will be dropped.

Some of the source communication patterns provided as input may have insufficient or invalid information to generate the right elementary rules. For example, in the above example of host 64.73.135.198 having a connection to host 192.168.254.200, if the port information is missing, the elementary rule generator 108 can potentially generate a rule that allows communication between the two hosts in the target environment. However, such a rule would also not place any restriction on the ports for connection, thereby allowing potentially unwanted traffic. Hence, the elementary rule generator 108 will classify such source communication patterns as unresolvable source communication patterns 114.

The elementary rules 116 along with known service ports 118 and the specified services ports 120 provide input to a vendor-neutral firewall rule generation heuristics component 122. The vendor-neutral firewall rule generation heuristics component 122 generates recommended vendor-neutral firewall rules 124.

Elementary rules 116 are an intermediate construct used for describing communication patterns and requirements that have been classified based on their relevance to individual firewall interfaces that need to be configured in the target environment. A vendor-neutral firewall rule contains all the attributes and their associated values necessary for configuring flow-control rules on a firewall device; however, it is not specific to one particular vendor. A vendor-neutral firewall rule may be likened to pseudo code, and vendor-specific firewall rules to machine-level code.

Vendor-neutral firewall rule generation can be performed for each firewall interface in the target environment. Input includes elementary rules for each firewall interface, and according to at least one embodiment of the invention, for each interface, the set of firewall rules that will "cover" all of the elementary rules are generated.

To generate the vendor-neutral rules that are needed to configure a firewall interface based on the elementary rules, the techniques detailed herein include identifying the following:

(1) what services internal to the security zone guarded by the firewall interface need to be accessible from the outside, and from which devices and/or networks;

(2) what services external to the security zone guarded by the firewall interface need to be accessible by devices inside the security zone;

(3) what internal devices/networks/ports need to be blocked for access from external devices; and (4) what external devices/networks/ports need to be blocked for access from internal devices.

Each communication pattern contains two {IP address, port} pairs, one pair for each peer in the communication pattern. Here, an IP address may denote the address of a specific host or a subnet, and a port may denote a specific port number or range of numbers. The IP address or port may have the value ANY, denoting that all IP addresses and ports respectively are included. Whether one or both of the {IP address, port} tuples corresponds to a service can be identified based on the known port and specified ports information provided. Additionally, the identification can be performed based on heuristics, such as the following:

If a particular threshold (say, n) of communication patterns observed in the source environment indicate a connection with a particular {IP address, port} pair, then that indicates that the IP address is hosting a service on the specified port. Other example heuristics include:

- identifying transmission control protocol (TCP) services using SYN-ACK flags;
- aggregating elementary rules based on whether the source (or destination) IP addresses in those rules are part of the same subnet; and
- identifying servers by port ranges.

Additionally, at least one embodiment of the invention can implement tunable thresholds and strategies.

Once a particular {IP address, port} pair that occurs in the elementary rule for a firewall interface is identified as corresponding to a service, the vendor-neutral firewall rule generator generates for that interface:

- A rule for allowing inbound traffic into that {IP address, port} pair if the IP address is internal to the security zone guarded by the interface, unless such a rule had been previously generated; and
- A rule for allowing outbound traffic into that {IP address, port} pair if the IP address is external to the security zone guarded by the interface, unless such a rule had been previously generated.
- A rule for allowing traffic into that {IP address, port} pair if the interface is on the routing path for packets destined to that IP address.

As used herein, an elementary rule for a given firewall interface is covered by a firewall rule at that interface if and only if:

- The specified action to be taken (accept or deny) is the same for both the elementary rule and the firewall rule, and
- In case of an accept action, the set of all packets accepted by the elementary rule is a subset of the set of all packets accepted by the firewall rule, and
- In case of a deny action, the set of all packets denied by the elementary rule is a subset of the set of all packets denied by the firewall rule.

As example, consider the following subset of elementary rules generated for the firewall interface 10.20.6.1 (Table I):

| PROTOCOL | SOURCE_IP | SOURCE_PORT | DEST_IP | DEST_PORT | DIRECTION | ACTION |
|---|---|---|---|---|---|---|
| TCP | 10.20.6.11 | 22 | 10.20.81.87 | 50022 | OUTGOING | ACCEPT |
| TCP | 10.20.6.11 | 22 | 192.251.125.40 | 22880 | OUTGOING | ACCEPT |
| TCP | 10.20.6.11 | 22 | 192.251.125.40 | 51950 | OUTGOING | ACCEPT |
| TCP | 10.20.6.11 | 22 | 192.251.125.40 | 54532 | OUTGOING | ACCEPT |
| TCP | 10.20.6.11 | 22 | 192.251.125.40 | 28193 | OUTGOING | ACCEPT |
| TCP | 10.20.6.11 | 22 | 192.251.125.40 | 43561 | OUTGOING | ACCEPT |
| TCP | 10.20.6.11 | 22 | 192.251.125.40 | 53955 | OUTGOING | ACCEPT |
| TCP | 10.20.6.11 | 22 | 64.73.135.198 | 38711 | OUTGOING | ACCEPT |
| TCP | 10.20.6.11 | 22 | 64.73.135.198 | 19583 | OUTGOING | ACCEPT |
| TCP | 10.20.6.11 | 22 | 64.73.135.198 | 25571 | OUTGOING | ACCEPT |
| TCP | 10.20.6.11 | 22 | 64.73.135.198 | 38727 | OUTGOING | ACCEPT |
| TCP | 10.20.6.11 | 22 | 64.73.135.198 | 25553 | OUTGOING | ACCEPT |
| TCP | 10.20.6.11 | 22 | 64.73.135.198 | 38654 | OUTGOING | ACCEPT |
| TCP | 10.20.6.11 | 22 | 64.73.135.198 | 38733 | OUTGOING | ACCEPT |
| TCP | 10.20.6.11 | 22 | 64.73.135.198 | 25565 | OUTGOING | ACCEPT |
| TCP | 10.20.6.11 | 22 | 64.73.135.198 | 25580 | OUTGOING | ACCEPT |
| TCP | 10.20.6.11 | 22 | 64.73.135.198 | 25551 | OUTGOING | ACCEPT |
| TCP | 10.20.6.11 | 22 | 64.73.135.198 | 38652 | OUTGOING | ACCEPT |

An example set of vendor-neutral firewall rules that can cover the above elementary rules can include (Table II):

| FW_INTERFACE_IP | SOURCE_ADDRESS | SOURCE_SUBNET_MASK | DEST_ADDRESS | DEST_SUBNET_MASK |
|---|---|---|---|---|
| 10.20.6.1 | 10.20.81.87 | 255.255.255.255 | 10.20.6.11 | 255.255.255.255 |
| 10.20.6.1 | 192.251.125.40 | 255.255.255.255 | 10.20.6.11 | 255.255.255.255 |
| 10.20.6.1 | 64.73.135.198 | 255.255.255.255 | 10.20.6.11 | 255.255.255.255 |

| FW_INTERFACE_IP | PROTOCOL | DEST_PORT | ACTION | FLOW_DIRECTION | SOURCE_PORT |
|---|---|---|---|---|---|
| 10.20.6.1 | TCP | 22 | accept | IN | ANY |
| 10.20.6.1 | TCP | 22 | accept | IN | ANY |
| 10.20.6.1 | TCP | 22 | accept | IN | ANY |

Another example set of vendor-neutral firewall rules that can cover the above elementary rules can include (Table III):

| FW_INTERFACE_IP | SOURCE_ADDRESS | SOURCE_SUBNET_MASK | DEST_ADDRESS | DEST_SUBNET_MASK |
|---|---|---|---|---|
| 10.20.6.1 | ANY | ANY | 10.20.6.11 | 255.255.255.255 |

| FW_INTERFACE_IP | PROTOCOL | DEST_PORT | ACTION | FLOW_DIRECTION | SOURCE_PORT |
|---|---|---|---|---|---|
| 10.20.6.1 | TCP | 22 | accept | IN | ANY |

While both sets of vendor-neutral firewall rules can cover the above elementary rules (Table I), the first set (Table II) allows a stricter set of flows (that is, only those originating from IP addresses 10.20.81.87, 192.251.125.40, 64.73.135.198 and destined to port 22 of IP address 10.20.6.11) than the second set (Table III) (that is, any flow destined to port 22 of IP address 10.20.6.11). While the first set (Table II) provides greater security, the second set (Table III) provides greater flexibility. Based on its setting, the vendor-neutral firewall rule generation component may generate rules that provide greater security or greater flexibility or both.

Figure 2:
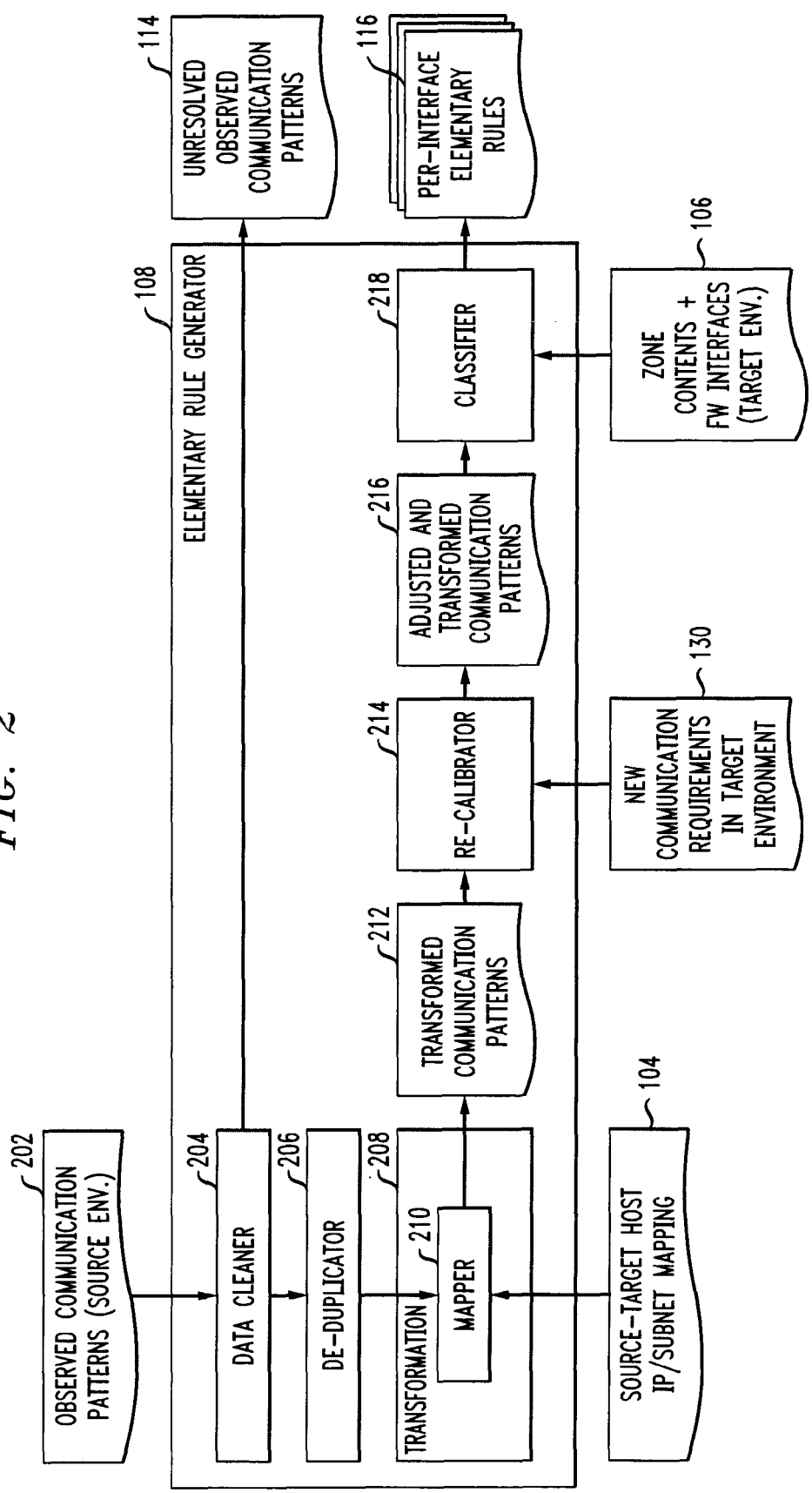

FIG. 2 is a diagram illustrating rule generation, according to one embodiment of the invention. By way of illustration, FIG. 2 depicts observed communications patterns 202 (from the source environment), which are provided to the elementary rule generator component 108 (as depicted in FIG. 1). Elementary rule generator component 108 carries out a flow of data between multiple sub-components including a data cleaner component 204, a de-duplicator component 206, and a transformation component 208 which includes a mapper component 210 (the mapper component receiving a source-target mapping 104 as input). The data cleaner component 204 categorizes source environment communication patterns into one of two categories: (1) patterns that have insufficient or invalid information to generate the right elementary rules are categorized as unresolvable, and (2) the rest of the patterns are passed on for further processing to generate elementary rules. The de-duplicator component 206 is an optional component and removes duplicate communication patterns for improved efficiency in later processing stages.

The transformation component 208 generates transformed communication patterns 212 based on the source-target host/IP subnet mapping information 104. If source-target host/IP subnet mapping information 104 is empty or not provided, the transformed communication patterns will be the same as the input provided to the transformation component 208. As explained herein, the source-target host/IP subnet mapping information 104 describes how an IP address that occurs in the communication pattern(s) changes as a result of the IT transformation activity. For example, the source-target mapping may specify that the IP address of the ssh server changes from 192.168.254.200 to 10.20.6.11 as a result of the IT transformation. The transformation component 210 applies such mapping information 104 to the cleaned (and possibly, de-duplicated) source communication patterns provided as input. The transformed communication patterns 212 will have the mapped IP addresses and subnets, where applicable.

The transformed communication patterns 212 are forwarded to a re-calibrator component 214 (which receives input in the form of new communication requirements 130 in the target environment). The new communication requirements may be of two types:

Communication patterns previously present in the source environment, but that should be avoided in the target environment. Suppose that communication to a web server from a certain client was allowed previously, but in the data center to which the web server is being migrated to, that client should not be allowed to connect to the web server.

Communication patterns not were previously present in the source environment, but should be allowed in the target environment. Suppose that a new service (that was absent in the source environment) is going to be deployed at port 50505 at a server that is being migrated to the target environment. Consequently, this new communication pattern should be taken into account when generating elementary rules.

Based on the new communication requirements, the re-calibrator component 214 generates adjusted and transformed communication patterns 216, which are provided to a classifier component 218 (which receives zone contents and firewall interfaces 106 from the target environment), which ultimately outputs per-interface elementary rules 116. The classifier component 218 considers each firewall interface that needs to be configured in the target environment, and identifies the subset of adjusted and transformed communication patterns 216 that are relevant for the interface. An adjusted and transformed communication pattern is relevant to an interface, if the pattern contains the source IP address, source subnet, destination IP address, or destination subnet that is part of the security zone guarded by the firewall interface. Additionally, the communication pattern is deemed relevant for the firewall interface if the firewall is one of the hops in the routing path for that pattern. Note that some adjusted and transformed communication patterns may not be relevant to any firewall interface in the target environment, while other patterns may not warrant generating an elementary rule (for example, when both the source IP address and the destination IP address are in the same security zone).

In the above example of host 64.73.135.198 having a connection to the ssh server 192.168.254.200 (whose IP address in the target environment is 10.20.6.11), the adjusted and transformed communication pattern may specify that communication be allowed from 64.73.135.198 to 192.168.254.200 on port 22. If there is a firewall interface with IP address 10.20.6.1 that guards the security zone containing subnet 10.20.6.0/24, then that communication pattern will be classified as relevant for the firewall interface, and hence will be part of the set of elementary rules generated for the firewall interface.

Figure 3:
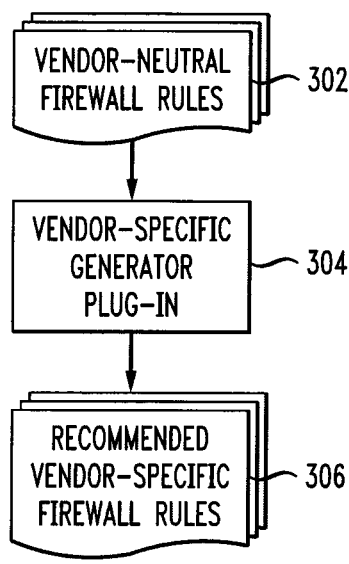
FIG. 3 is a diagram illustrating vendor-neutral to vendor-specific firewall rules, according to an embodiment of the invention.

FIG. 3 is a diagram illustrating vendor-neutral to vendor-specific firewall rules, according to an embodiment of the invention. By way of illustration, FIG. 3 depicts vendor-neutral firewall rules 302, which are provided to a vendor-specific generator plug-in 304. The vendor-specific generator plug-in 304 generates recommended vendor-specific firewall rules 306. There may be different vendor-specific generator plug-ins for different firewall vendors and models. The vendor-specific generator plug-in component converts recommended vendor-specific firewall rules into a set of commands that can be used to directly configure a particular firewall device.

Consider the set of vendor-neutral firewall rules in the previous example (Table II):

configured dependencies at one or more servers running on the source environment, analyzing one or more firewall log files, and/or using manually provided information about one or more flows at the source environment.

Additionally, as detailed herein, obtaining communication patterns can also include deriving results from an environment discovery tool, deriving results from a flow spreadsheet, obtaining information pertaining to service ports, etc.

Step 404 includes automatically generating one or more vendor-neutral rules for one or more intended firewall interfaces in a post-transformation target environment based on the at least one communication pattern occurring in the source environment and based on information derived from the target environment. Information derived from the target environment used for automatically generating one or more vendor-neutral firewall rules can include firewall topology, security zone topology, security zone contents, and/or a new internet protocol (IP) address and subnet information.

Automatically generating one or more vendor-neutral rules can include determining whether a communication pattern and/or one or more additional requirements from the target environment are relevant for the one or more firewall interfaces in the target environment. Additionally, automatically generating one or more vendor-neutral rules can include automatically generating one or more vendor-neutral per-interface rules for one or more intended interfaces in the target environment based on the at least one communication pattern occurring in the source environment and/or one or more additional requirements from the target environment that are determined relevant for each of those interface.

| FW_INTERFACE_IP | SOURCE_ADDRESS | SOURCE_SUBNET_MASK | DEST_ADDRESS | DEST_SUBNET_MASK |
|---|---|---|---|---|
| 10.20.6.1 | 10.20.81.87 | 255.255.255.255 | 10.20.6.11 | 255.255.255.255 |
| 10.20.6.1 | 192.251.125.40 | 255.255.255.255 | 10.20.6.11 | 255.255.255.255 |
| 10.20.6.1 | 64.73.135.198 | 255.255.255.255 | 10.20.6.11 | 255.255.255.255 |

| FW_INTERFACE_IP | PROTOCOL | DEST_PORT | ACTION | FLOW_DIRECTION | SOURCE_PORT |
|---|---|---|---|---|---|
| 10.20.6.1 | TCP | 22 | accept | IN | ANY |
| 10.20.6.1 | TCP | 22 | accept | IN | ANY |
| 10.20.6.1 | TCP | 22 | accept | IN | ANY |

A plug-in for the CISCO™ PIX device, for instance, may generate the following commands for configuring the device to allow flows specified by the above set of vendor-neutral firewall rules:

```
nameif ethernet0 outside intf123
ip address intf123 10.20.6.1 255.255.255.0
access-list ACL1 permit tcp 10.20.81.87 10.20.6.11 eq ssh
access-list ACL1 permit tcp 192.251.125.40 10.20.6.11 eq ssh
access-list ACL1 permit tcp 64.73.135.198 10.20.6.11 eq ssh
access-group ACL1 in interface intf123
```

Figure 4:
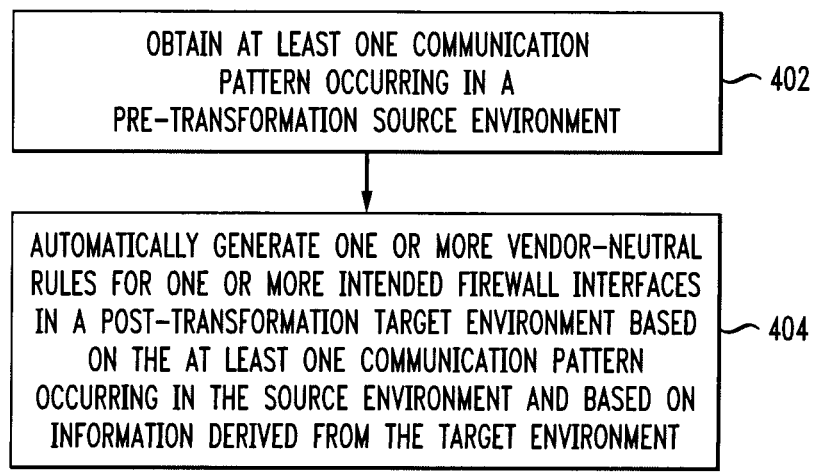
FIG. 4 is a flow diagram illustrating techniques for automatically generating one or more rules during IT transformation for configuring one or more firewall interfaces in a post-transformation target environment, according to an embodiment of the invention.

FIG. 4 is a flow diagram illustrating techniques for automatically generating one or more rules during IT transformation for configuring one or more firewall interfaces in a post-transformation target environment, according to an embodiment of the present invention. Step 402 includes obtaining at least one communication pattern occurring in a pre-transformation source environment. Obtaining at least one communication pattern can include performing an analysis of one or more firewall configuration files associated with the source environment, observing one or more run-time network flows at the source environment, analyzing one or more Automatically generating one or more vendor-neutral per-interface rules for one or more intended interfaces in the target environment can include generating at least one transformed communication pattern by applying a source environment-target environment IP address or subnet mapping to the at least one communication pattern occurring in the source environment (where the mapping function may be an identity function), incorporating new communication and/or new security requirements from the target environment, and/or incorporating information pertaining to zone contents and firewall interfaces of the target environment. Additionally, at least one embodiment of the invention includes applying heuristics and/or user-provided information to identify one or more service ports.

Further, automatically generating one or more vendor-neutral rules for one or more intended firewall interfaces in a target environment can include accounting for one or more rules already implemented for the target environment's firewalls and recommending additions, deletions, and/or updates to those rules.

The techniques depicted in FIG. 4 can additionally include automatically converting the one or more vendor-neutral rules into one or more vendor-specific firewall rules for the target environment based on information derived from the target environment. Information derived from the target environment can include already-implemented vendor-specific firewall rules in the target environment, information about the firewall vendor, model, and interfaces.

Also, the techniques depicted in FIG. 4 can include automatically generating vendor-specific firewall rules for a target environment during an IT transformation activity. Further, as detailed herein, an IT transformation activity can include migration, consolidation, virtualization, data center relocation, and cloudification of at least one application or server or service from a source information technology infrastructure to a target information technology infrastructure.

As detailed herein, in at least one embodiment of the invention, only a subset of devices in the source environment are being transformed. Also, firewall and/or security zone topology in the target environment can be partially or fully different from that of the source environment, and the devices in the target environment can be from a different vendor and/or model and/or platform from one or more devices in the source environment. Additionally, firewall devices can include physical and/or virtual devices. Further, in at least one embodiment of the invention, security requirements in the source environment can differ from those in the target environment, and connectivity requirements in the source environment can also differ from those in the target environment.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 5:
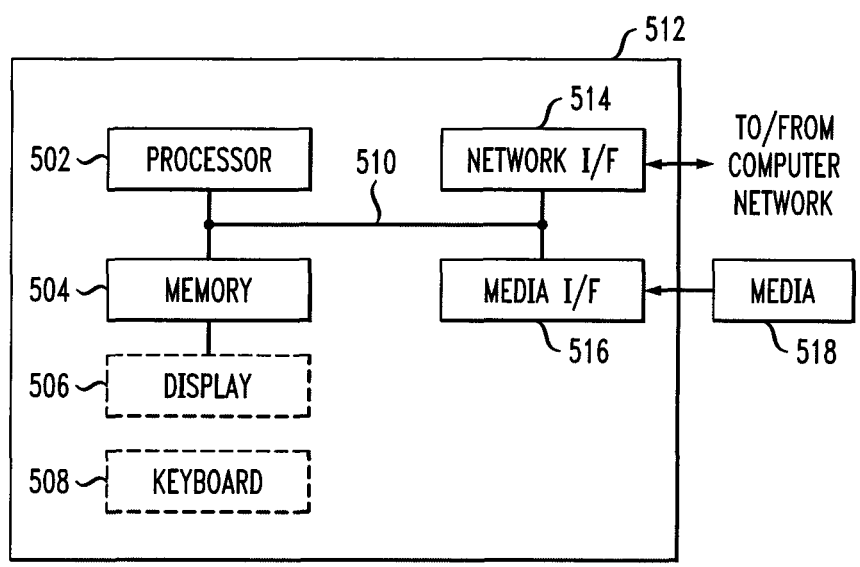
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, automatically identifying configurations for the firewalls in a target environment during migration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically generating one or more rules during IT transformation for configuring one or more firewall interfaces in a post-transformation target environment, the method comprising:
    obtaining at least one communication pattern occurring in a pre-transformation source environment by analyzing (i) one or more firewall configuration files and/or firewall log files associated with the source environment, (ii) one or more run-time network flows at the source environment, and (iii) one or more configured dependencies at one or more servers running on the source environment;
    automatically generating one or more vendor-neutral firewall rules for multiple intended firewall interfaces, on a per-interface basis, in a post-transformation target environment based on (i) the at least one communication pattern occurring in the source environment and (ii) information derived from the target environment, wherein the one or more vendor-neutral firewall rules contain multiple attributes and values associated therewith for configuring flow-control rules on a firewall device that is not specific to any particular vendor, and wherein said automatically generating comprises:
        generating a transformed version of the at least one communication pattern by applying source-target host and internet protocol (IP) subnet mapping information to the at least one communication pattern;
        generating an adjusted version of the at least one communication pattern by incorporating one or more communication requirements associated with the target environment to the transformed version of the at least one communication pattern;
        identifying a subset of the adjusted version of the at least one communication pattern to be utilized for each of the multiple intended firewall interface in the post-transformation target environment; and
    automatically converting the one or more vendor-neutral firewall rules into one or more vendor-specific firewall rules for the target environment based on information derived from the target environment, wherein the one or more vendor-specific firewall rules comprise commands to be directly used to configure a particular firewall device associated with a particular vendor;
    wherein at least one of the steps is carried out by a computer device.

2. The method of claim 1, wherein obtaining at least one communication pattern further comprises:
    using manually provided information about one or more flows at the source environment.

3. The method of claim 1, wherein information derived from the target environment used for automatically generating one or more vendor-neutral firewall rules comprises at least one of:
    firewall topology;
    security zone topology;
    security zone contents; and
    a new internet protocol (IP) address and subnet information.

4. The method of claim 1, wherein obtaining at least one communication pattern further comprises obtaining information pertaining to service ports.

5. The method of claim 1, wherein automatically generating one or more vendor-neutral rules comprises:
    determining whether a communication pattern and/or one or more additional requirements from the target environment are relevant for the multiple firewall interfaces in the target environment; and
    automatically generating one or more vendor-neutral per-interface rules for one or more intended interfaces in the target environment based on the at least one communication pattern occurring in the source environment and/or one or more additional requirements from the target environment that are determined relevant for each interface.

6. The method of claim 5, wherein automatically generating one or more vendor-neutral per-interface rules for multiple intended interfaces in the target environment comprises generating at least one transformed communication pattern by applying a source environment-target environment IP address or subnet mapping to the at least one communication pattern occurring in the source environment.

7. The method of claim 5, wherein automatically generating one or more vendor-neutral per-interface rules for multiple intended interfaces in the target environment comprises incorporating new communication and/or new security requirements from the target environment.

8. The method of claim 5, wherein automatically generating one or more vendor-neutral per-interface rules for multiple intended interfaces in the target environment comprises incorporating information pertaining to zone contents and firewall interfaces of the target environment.

9. The method of claim 5, wherein automatically generating one or more vendor-neutral per-interface rules for multiple intended interfaces in the target environment comprises applying heuristics and/or user-provided information to identify one or more service ports.

10. The method of claim 1, wherein only a subset of devices in the source environment are transformed.

11. The method of claim 1, wherein firewall and/or security zone topology in the target environment is partially or fully different from that of the source environment.

12. The method of claim 1, wherein one or more devices in the target environment are from a different vendor and/or model and/or platform from one or more devices in the source environment.

13. The method of claim 1, wherein one or more firewall devices are physical or virtual devices.

14. The method of claim 1, wherein one or more security requirements in the source environment differ from those in the target environment.

15. The method of claim 1, wherein one or more connectivity requirements in the source environment differ from those in the target environment.

16. The method of claim 1, wherein information derived from the target environment comprises already-implemented vendor-specific firewall rules in the target environment.

17. The method of claim 1, wherein automatically generating one or more vendor-neutral firewall rules for multiple intended firewall interfaces in a target environment comprises accounting for one or more rules already implemented for the target environment's firewalls and recommending additions, deletions, and/or updates to the one or more rules.

18. The method of claim 1, comprising automatically generating one or more vendor-specific firewall rules for a target environment during an enterprise information technology transformation activity.

19. The method of claim 18, wherein an enterprise information technology transformation activity comprises at least one of migration, consolidation, virtualization, data center relocation, and cloudification of at least one application or server or service from a source information technology infrastructure to a target information technology infrastructure.

* * * * *